United States Patent
Kunov

[15] 3,673,979
[45] July 4, 1972

[54] ALCOHOL LEVEL INDICATOR

[72] Inventor: Hans Kunov, Toronto, Ontario, Canada

[73] Assignee: said Gordon, by said Kunov, Toronto, Ontario, Canada

[22] Filed: Oct. 27, 1971

[21] Appl. No.: 192,888

Related U.S. Application Data

[63] Continuation-in-part of Ser. No. 94,255, Dec. 2, 1970, abandoned.

[52] U.S. Cl.................................116/129, 58/127, 128/2.1, 235/83, 235/120
[51] Int. Cl.............................................................G09f 9/00
[58] Field of Search......................33/132; 58/74, 126, 152; 116/114, 129; 128/2, 2.1; 235/91, 103, 104, 177, 184; 273/114, 148

[56] References Cited

UNITED STATES PATENTS 3,521,045  7/1970  Murphy...............................235/184

*Primary Examiner*—Louis J. Capozi
*Attorney*—James T. Wilbur et al.

[57] ABSTRACT

The device has two hands, one which points to a scale labelled "blood alcohol level" and the other which points to a scale labelled "body weight." A knob is provided for turning the "body weight" hand to the subject's weight and a second knob is provided for registering drinks consumed. Upon consumption of each drink, the subject presses the second knob. In one embodiment of the invention, pressing of the second knob causes the "blood alcohol level" hand to advance an increment and in the other embodiment the "blood alcohol level" scale incrementally advances. An adjustment means cooperates with the second knob to limit the advance of the hand or scale according to the subject's weight so that immediately following the advance, the "blood alcohol level" hand points to the approximately true alcohol level in the subject's blood stream. A watch-like mechanism regresses the hand or scale at a constant rate corresponding to the rate of disappearance of alcohol from the blood stream.

7 Claims, 7 Drawing Figures

INVENTOR.
HANS KUNOV

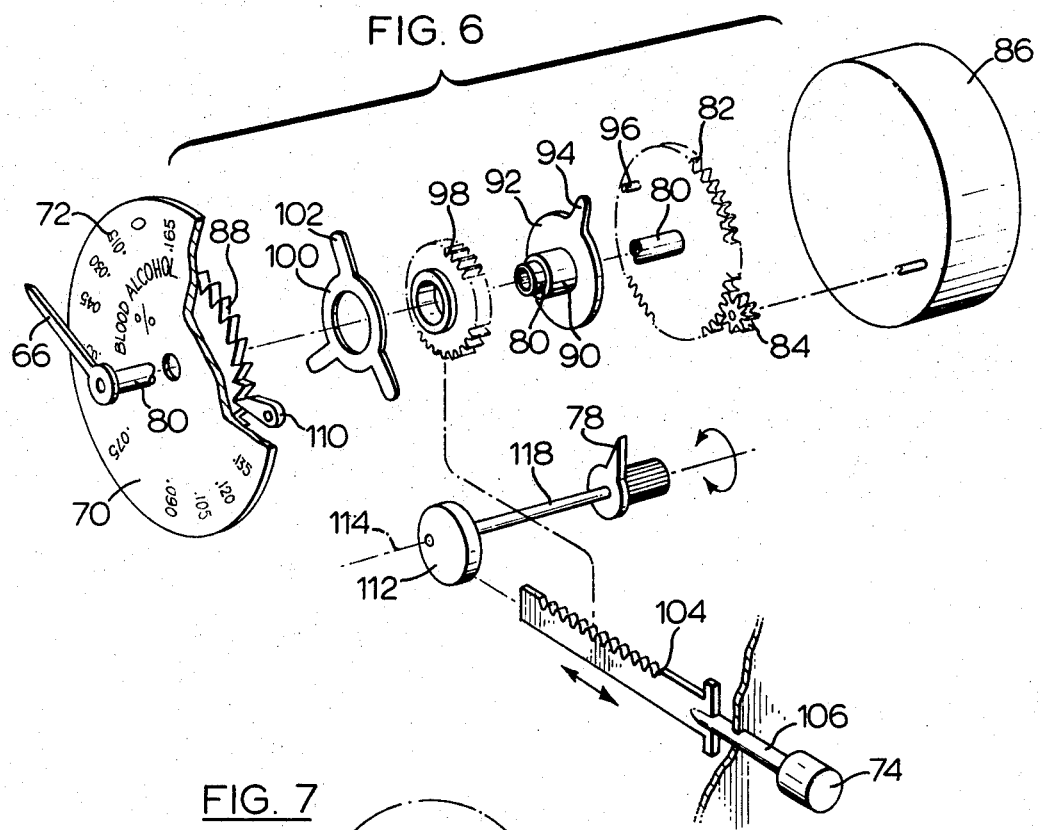
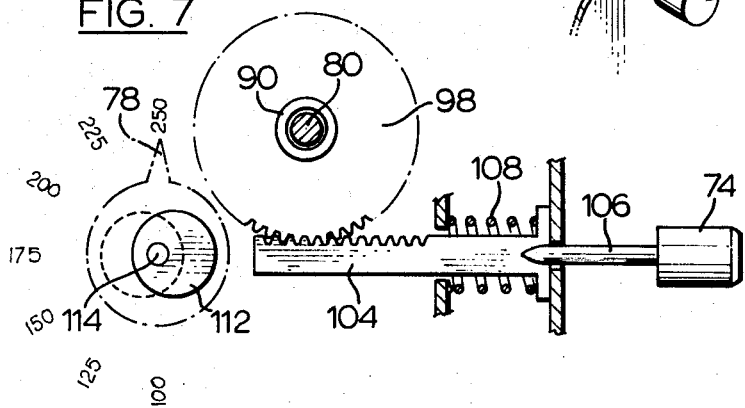

ALCOHOL LEVEL INDICATOR

This application is a continuation-in-part of application Ser. No. 94,255 filed Dec. 2, 1970, now abandoned.

This invention relates to a measuring apparatus and more particularly to a device for providing a continuous indication of the level of alcohol in the blood stream of a person who is consuming alcoholic beverages.

In most common law jurisdictions at the present time, a person is deemed "intoxicated" for purposes of offences such as driving a motor vehicle while intoxicated if his blood alcohol level is above a certain arbitrary value. A person who is suspected of having committed such an offence may be required to submit to a test to determine his blood alcohol level or if he refuses is conclusively deemed to have committed the offence.

The most common device for measuring blood alcohol level is a so-called breathalyzer in which a sample of air exhaled by a subject is analyzed and the results of the analysis related to blood alcohol level. The breathalyzer requires a skilled technician to operate it properly and is very expensive.

Persons who wish to drive after they have consumed a number of alcoholic beverages have little if any way of knowing whether they are legally "intoxicated." A breathalyzer is completely impractical for this purpose. One known device which may be used for this purpose comprises a cardboard card to which a circle is rotatably attached. Three scales are printed on the device, body weight, number of drinks consumed, and blood alcohol level. To determine blood alcohol level, the person using the device must manipulate the device having regard to his weight, the number of alcoholic beverages consumed and the alcoholic content of each and the time taken to consume the beverages. A mental calculation is also required in order to determine blood alcohol level.

A person using such a device has some well founded doubts about his sobriety otherwise he would not be using it. The difficulties of using the device in such a condition are great and in all probability the blood alcohol level read from the device will be incorrect. In addition, the device gives an incorrect reading where the time between successive drinks is irregular. The device therefore has little if any practical value for its intended purpose.

It is accordingly an object to provide an alcohol level indicator which is portable, easily operated and requires no mental calculation.

A further object is to provide a device from which blood alcohol level can be directly read.

Another object is to provide a device which furnishes a continuous indication of blood alcohol level.

These and other objects may be accomplished by a device providing a continuous indication of the level of alcohol in a human's blood stream into which said alcohol is introduced including: means for indicating the level of alcohol in the blood stream; means for incrementally advancing said indicating means to denote a higher level of alcohol in the blood stream; adjustment means cooperating with said advancing means for limiting the advance of said indicating means so that the level of alcohol denoted by said indicating means after each incremental advance thereof corresponds to the approximately true increase in the level of alcohol in the blood stream caused by the introduction of a given quantity of alcohol therein; and means operatively connected to and causing said indicating means to recede at a constant rate such that the decreasing level of alcohol denoted by said indicating means corresponds to the decreasing level of alcohol in the blood stream.

According to one preferred embodiment of the invention, the device resembles a stop watch. Two graduated scales are printed on the dial thereof; one labelled "body weight" and the other "blood alcohol level." A movable hand permits reading to be taken from each scale. A knob is also provided for turning the body weight hand and a second knob is provided for registering each drink consumed. A subject who is using the device turns the body weight knob until the hand points to his weight. After consumption of an alcoholic beverage, the subject pushes the other knob to register the drink. The true level of alcohol in the subject's blood stream can be read at any time from the blood alcohol level scale.

According to another preferred embodiment of the invention, the device may be incorporated into a conventional timepiece such as a watch or clock. A graduated scale labelled "blood alcohol level" is rotatably mounted concentric to the hour and minute gradations of the time-piece and readings from the blood alcohol level scale are denoted by the hour hand. The subject's body weight is registered by manipulating a hand on the back of the time-piece until the hand points to the correct weight. After consumption of an alcoholic beverage, the subject pushes a knob to advance the blood alcohol level scale such that the hour hand indicates the level of alcohol in the subject's blood stream. The hour hand moves across the scale at a rate corresponding to the rate of disappearance of alcohol in the subject's blood stream.

A fuller understanding of the invention may be had by referring to the following description of a preferred embodiment of the present invention taken in conjunction with the accompanying drawings in which:

FIG. 4 and 5 are front and back elevations of a second embodiment of the indicator;

FIG. 6 is an exploded perspective view of the components of the indicator illustrated in FIGS. 4 and 5; and FIG. 7 is a front elevation, in greater detail, of certain of the components illustrated in FIG. 6.

Like reference characters refer to like parts throughout the description of the drawings.

Figure 1:
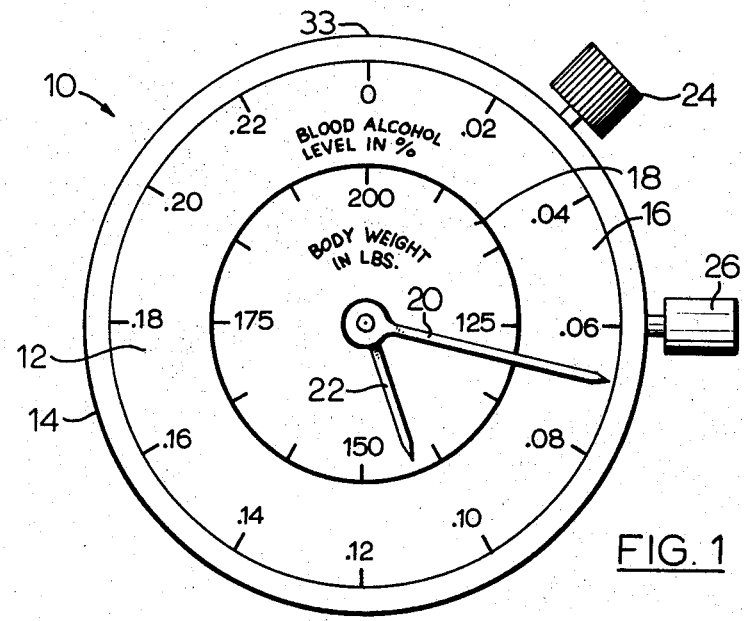
FIG. 1 is a front elevation of one embodiment of the indicator of invention.

With reference to FIG. 1, the indicator of the invention is indicated generally 10 and is composed of a circular dial 12 mounted to a housing 14. The dial is graduated into two concentric scales, an outer scale 16 labelled "blood alcohol level in %" and an inner scale 18 laballed "body weight in lbs." Two hands or pointers 20 and 22 extend radially outward from the center of the dial. The long hand 20 points to blood alcohol level and short hand 22 points to body weight in pounds.

Two knobs 24 and 26 are located at the side of the housing. Rotation of knob 24 causes short hand 22 to sweep across the body weight scale. Knob 26 is adapted to be depressed and when so depressed causes long hand 20 to change its position.

Figure 2:
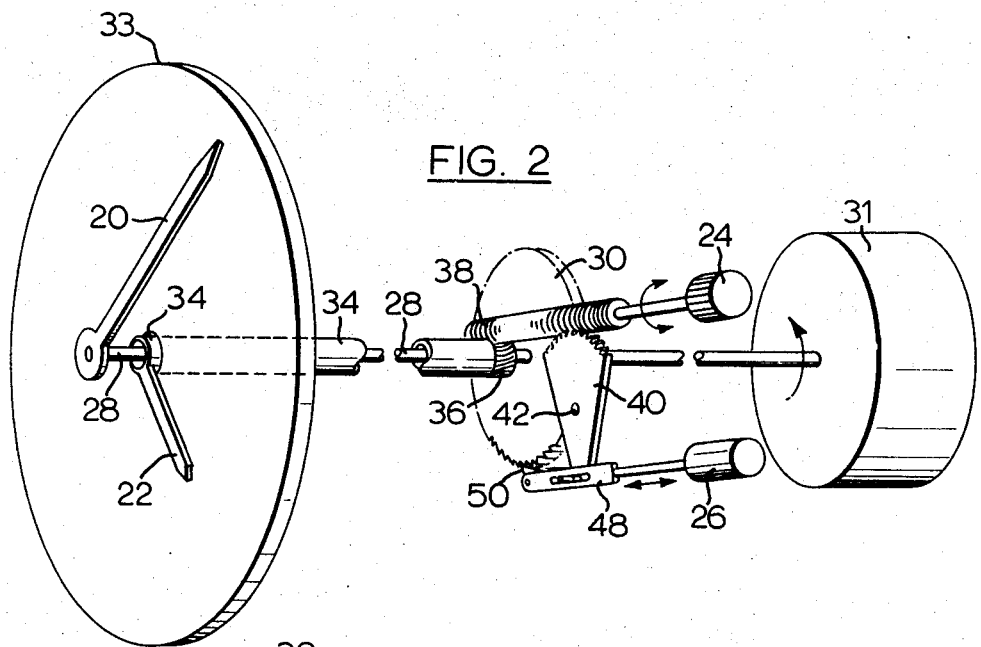
FIG. 2 is an exploded perspective view of the components of the indicator illustrated in FIG. 1.

With reference to FIG. 2, long hand 20 is fastened to an end of shaft 28. A ratchet wheel 30 is fixed to shaft 28 midway of its ends and the end of the shaft remote from long hand 20 is joined by a frictional connection (not illustrated) to a conventional drive mechanism 31 which turns the shaft counterclockwise (as illustrated by arrow 32) at a constant rate. As the shaft turns, so too does long hand 20 and ratchet wheel 30. A stop mechanism is provided to arrest movement of the hand when it reaches "zero" position 33 located at the top of the dial.

Drive mechanism 31 is conventional and is preferably spring driven of the type found in a wrist watch or a stop watch. Where a spring driven mechanism is employed, a knob (not illustrated) must be provided for winding the device. The rate at which drive mechanism 30 must turn hand 20 is described hereinbelow.

Short hand 22 is fastened to an end of a cylindrical-shaped shaft 34 disposed concentrically about shaft 28. Cylindrical shaft 34 extends from short hand 22 and terminates at a worm wheel 36. The teeth of wheel 36 mesh with the spiral gear of worm 38 and the worm is turned by knob 24. A portion of the gear of worm 38 also meshes with the teeth of rack 40. When knob 24 is turned, motion is imparted to wheel 36 which causes short hand 22 to turn. Motion is also imparted to rack 40 which turns about axis 42.

Figure 3:
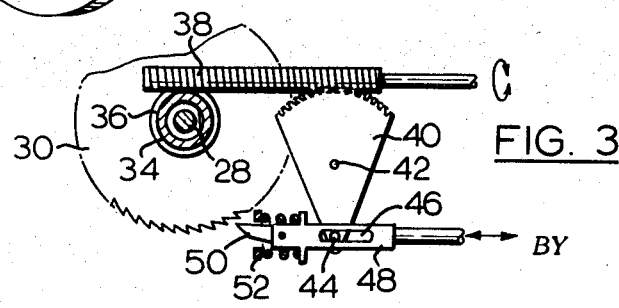
FIG. 3 is a front view, in greater detail, of certain of the components illustrated in FIG. 2.

With reference to FIG. 3, rack 40 is shaped somewhat in a shape of a wedge in which the teeth which mesh with worm 38 extend along the thickened end and a pin 44 projects outwardly from the thin end. Pin 44 is freely slidable in a slot 46 cut in plunger 48. Knob 26 is fastened to one end of the plunger and a pawl 50 is connected to the other end.

As illustrated, pawl 50 is spaced apart from the teeth of ratchet wheel 30 and offers no resistance to turning of the wheel in a counter-clockwise direction. When knob 26 is pushed inward, pawl 50 moves into engagement with a tooth of wheel 30 thereby turning the wheel in a clockwise direction. Counter-clockwise motion is not however imparted to drive mechanism 31 because of the frictional connection between the mechanism and shaft 28. The distance travelled by the plunger is limited by pin 44. Thus upon depressing knob 26, the plunger will move inward until the pin contacts the end of the slot closer to the knob. No further inward movement of the plunger is then possible. The location of the pin relative to the track 40 governs the amount of advance of ratchet wheel 30 caused by depressing knob 26. The position of the pin may be adjusted by rotating knob 24.

Plunger 48 is mounted in a spring loaded sleeve 52 which returns the plunger to the illustrated position when inward pressure on knob is relaxed.

The operation of the indicator is described herein with reference to a specific example. The exemplary subject is a guest at a cocktail party and wishes to determine his blood alcohol level from time to time. The subject weighs 150 lbs. and before he beings to drink, he turns knob 24 until small hand 22 points to his weight. While he is turning knob 24, the position of pin 44 is adjusted as rack 40 is moved by worm 38.

The subject consumes a "rye and water" containing 1 ½ oz. rye whiskey after which he depresses knob 26. In depressing the knob, pawl 50 moves into engagement with wheel 30 and hand 20 advances from zero. The amount of advance of hand 20 is limited by pin 44 so that the blood alcohol level pointed to by the hand corresponds to the true level in the subject's blood stream resulting from the consumption of the drink.

Blood alcohol level (mg/100G) after consumption of a "-drink" may be determined with fair accuracy using the following empirical formula:

Blood alcohol level = 4250/wt. in lbs.

A "drink" for purposes of the formula is:

| | |
|---|---|
| Whiskey, gin, rum | 1 ¼ or 1 ½ oz. |
| Beer | One bottle, 12 oz. |
| Conventional cocktail | |
| Table wine or champagne | 5 oz. |
| Fortified wine | |
| (e.g. port, sherry) | 3 oz. |
| Liqueur | 2 oz. |

Thus, after the subject has consumed the "drink," his blood alcohol level will rise to approximately 4250/150 150 or 28 mg/100G or 0.028 percent. This formula also holds approximately true for each "drink" consumed provided the drinks are consumed in rapid succession. After consumption of a second "drink," the blood level alcohol will increase to 0.056 percent (2 × 0.028%) and to 0.084 percent after consumption of third drink.

Pin 44 is so arranged with respect to plunger 48 that when hand 22 points to 150 lbs., hand 20 registers an increase in blood alcohol level of 0.028 percent every time knob 26 is depressed.

After the subject has released knob 26, drive mechanism 31 causes shaft 28 to rotate counter-clockwise so that the long hand 20 recedes towards zero. The hand recedes at the rate of 0.015 percent (blood alcohol level) per hour and stops when it reaches zero. The disappearance rate of 0.015 percent per hour applies regardless of the man's weight and is the experimentally found rate of disappearance of alcohol in the blood stream of a healthy human. (See H. Elbel: Blutalkohol, Georg Thieme Verlag, Stuttgart 1956 pg. 52–56). The disappearance rate will be somewhat lower in a person suffering from a disease of the liver. It is therefore contemplated that a notice will be printed on the device warning against use by persons suffering from such a disease.

Each time the man consumes a "drink" he depresses knob 26. If he takes a double strength drink, he must of course depress knob 26 twice. Hand 20 will indicate at all times the approximately correct level of alcohol in the man's blood stream.

The worm gear 38, rack 40 and slot in plunger 48 cooperate to limit the advance of hand 20 so that the level of alcohol denoted by the hand after each incremental advance of plunger 48 caused by depressing knob 26 corresponds to the true increase in the level of alcohol in the blood stream caused by the consumption of each drink.

It should be noted that there is a direct relationship between body weight and increase in blood alcohol level resulting from consumption of a given quantity of alcohol. Thus body weight setting and advance of hand 20 caused by pushing knob 26 must also vary directly with one another. This result is achieved since the distance of travel of the pin caused by turning of knob 24 varies directly as the amount of turning of the knob. In turning knob 24 to indicate a lower body weight, the teeth of rack 40 will be displaced to the right relative to worm 38. Pin 44 will therefore move closer to wheel 30 and plunger 48 may be pressed further inward before it is stopped by pin 44. Thus pawl 50 will turn wheel 30 and arm 20 through a larger angle. Conversely, turning of knob 24 to indicate a higher body weight will result in arm 20 turning through a smaller angle.

With reference to FIGS. 4 and 5, another embodiment of the indicator of the invention is shown incorporated in a conventional time-piece, such as a watch or clock, indicated generally 60. The time-piece has a circular face 62 displaying an hour and minute scale 64 imprinted along the outer edge. The time-piece includes two hands, a shorter "hour" hand 66 and a longer "minute" hand 68.

According to the invention, a ring 70 is rotatably mounted upon face 62. Ring 70 is imprinted with a scale 72 concentric with scale 64 and marked "blood alcohol level in %." Increasing levels of blood alcohol are disposed counter-clockwise on the scale. A knob 74 is located at the side of the timepiece and is adapted to be depressed and when so depressed, causes ring 70 to change its position.

With reference to FIG. 5, on the reverse side of the time-piece, a scale labelled "body weight in lbs." is imprinted. A hand or pointer 78 is rotatably mounted to the time-piece and a subject's body weight may be registered by manual rotation of hand 78 until the hand points to the required weight.

With reference to FIG. 6, shorter or "hour" hand 66 is fixed to shaft 80 which is connected to a conventional ratchet wheel 82, threadably driven by cog wheel 84 connected to drive mechanism 86. The mechanism just described for turning hour hand 66 is conventional and is found in most time-pieces.

The conventional mechanism is modified by the addition of ring 70 and driving parts connected thereto. The driving parts include a ratchet wheel 88 fixed to ring 70 and freely rotatable about shaft 80. Ratchet wheel 88 is fixed to one end of a tubular shaft 90 rotatably mounted about shaft 80. The other end of tubular shaft 90 is connected to stop plate 92 having a radially outward extending protuberance 94 adapted to contact pin 96 fixed to ratchet wheel 82. Ring 70 is rotated clockwise with hand 66 when protuberance 94 contacts pin 96.

A pinion 98 and clutch plate 100 are positioned about tubular shaft 90 between stop plate 92 and ratchet wheel 88. The pinion and clutch plate are fixed to one another but are not fastened to shaft 90 thus they may rotate relative thereto. The outwardly extending arms 102 of clutch plate 100 frictionally abut against ratchet wheel 88 and cause clutch plate 100 and ratchet wheel 88 to turn together unless a force greater than the frictional force between the two parts is applied to either one.

The teeth of pinion 98 mesh with the teeth of a drive rack 104 mounted for lateral movement within the time-piece.

Rack 104 is attached at one end to a shaft 106 which is attached at the other end to knob 74. When knob 74 is pushed inward, drive rack 104 moves laterally thereby causing pinion 98 to rotate. Clutch plate 100 being fixed to pinion 98 also rotates and ratchet wheel 88, in frictional engagement with the clutch plate, also turns.

A helical spring 108 is positioned about shaft 106 to maintain the drive rack 104 in the position illustrated in FIG. 7 when inward pressure on knob 74 is relaxed.

A non-back pawl 110 holds ratchet wheel 88 stationary when spring 108 causes rack 104 and clutch plate 100, operatively connected thereto, to turn in a counter-clockwise direction.

Spaced apart from the free end of rack 104 is a cam 112 eccentrically mounted about axis 114. Cam 112 is connected to shaft and pointer 78 which registers the subject's body weight is connected to the other end of the shaft.

When the indicator of the invention is not being used to indicate blood alcohol level, ring 70, imprinted with the blood alcohol level scale, rotates with hour hand 66 since pin 96 of ratchet wheel 82 contacts and drives stop plate 92 via protuberance 94. When ring 70 and hour hand 66 are turning together in this fashion, the hour hand indicates a "zero" blood alcohol level. Pinion 98 is held stationary by drive rack 104 and the arms of clutch plate 100 slide over ratchet wheel 88.

When the indicator is to be used for the intended purpose, hand 78 is turned until it points to the subject's body weight. As the hand is being turned, cam 112 turns about its center of rotation 114 and the distance changes between cam 112 and the facing end of rack 104.

After consuming a drink, the subject depresses knob 74 thereby moving drive rack 104 laterally and turning pinion 98 clockwise. As the pinion rotates, so too does clutch plate 100 and the clutch plate in turn causes ratchet wheel 88 and ring 70 to advance clockwise relative to hour hand 66. The amount of movement of drive rack 104 is determined by cam 112, the position of which is fixed by the body weight setting of hand 78. The blood alcohol level pointed to by hand 66 after depression of knob 74 is the true level in the subject's blood stream. After the drink is registered, the blood alcohol level ring 70 will remain stationary until pin 96 rotates into contact with protuberance 94 at which time the ring will again turn with the hour hand.

The blood alcohol level scale is calibrated such that when ring 70 is stationary, the hour hand sweeps across the scale at a rate corresponding to the rate of disappearance of alcohol from the blood stream. Since the disappearance rate is 0.015 percent (blood alcohol level) per hour and the hour hand moves one-twelfth of a revolution per hour, until one-twelfth of the circumference of the blood alcohol ring 70 must represent 0.015 percent.

It will be understood of course that further modifications can be made in the preferred embodiment of the indicator described and illustrated herein without departing from the scope and purview of the invention as defined by the appended claims.

What I claim as new and desire to protect by Letters Patent of the United States is:

1. A device for providing a continuous indication of the level of alcohol in a human's blood stream into which said alcohol is introduced including: means for indicating the level of alcohol in the blood stream; means for incrementally advancing said indicating means to denote a higher level of alcohol in the blood stream; adjustment means cooperating with said advancing means for limiting the advance of said indicating means so that the level of alcohol denoted by said indicating means after each incremental advance thereof corresponds to the approximately true increase in the level of alcohol in the blood stream caused by the introduction of a given quantity of alcohol therein; and means operatively connected to and causing said indicating means to recede at a constant rate such that the decreasing level of alcohol denoted by said indicating means corresponds to the decreasing level of alcohol in the blood stream.

2. A device for providing a continuous indication of the level of alcohol in a human's blood stream into which said alcohol is introduced including: a dial displaying a range of blood alcohol levels; a pointer mounted in apposition to said dial and indicating the level of alcohol in the blood stream; means for incrementally advancing one of said indicating means and said dial such that said indicating means denotes a higher level of alcohol in the blood stream; adjustment means cooperating with said advancing means for limiting said incremental advance so that the level of alcohol denoted by said indicating means after each said incremental advance corresponds to the approximately true increase in the level of alcohol in the blood stream caused by the introduction of a given quantity of alcohol therein; and means operatively connected to and causing one of said indicating means and said dial to recede at a constant rate such that the decreasing level of alcohol denoted by said indicating means corresponds to the decreasing level of alcohol in the blood stream.

3. The device as claimed in claim 1, wherein said adjustment means limits the advance of said indicating means according to the weight of said human, the incremental advance decreasing as the weight of the human increases.

4. The device as claimed in claim 2 wherein said dial is advanced by said advancing means, said advancing means being a manually operable drive rack which engages a pinion operatively connected to said dial.

5. The device as claimed in claim 4 wherein said adjustment means comprises a second rack in apposition to said drive rack said second rack restricting the movement of said drive rack.

6. A device for providing a continuous indication of the level of alcohol in a human's blood stream into which said alcohol is introduced including: a housing having two graduated scales displayed thereon, one said scale denoting body weight and the other scale denoting blood alcohol level; a pair of movable pointers, each permitting readings from a different said scale; a first shaft having a ratchet wheel and being connected to said pointer denoting blood alcohol level; a second shaft having a worm wheel and connected to said pointer denoting body weight; a worm having a gear meshing with said worm wheel and having means permitting manual rotation thereof; a rack rotatable about a fixed axis and having teeth also meshing with said worm gear, said rack also having an outwardly projecting pin; a plunger having an elongated slot within which slides said pin and having means permitting manual depression thereof; a pawl connected to said plunger and engaging with teeth of said ratchet wheel so that upon depression of said plunger, said pawl turns said ratchet wheel to advance said pointer denoting blood alcohol level, the advance of said plunger being limited by said pin; and means operatively connected to said first shaft for receding said pointer denoting blood alcohol level at a constant rate.

7. A device for providing a continuous indication of the level of alcohol in a human's blood stream into which said alcohol is introduced including: a housing having two graduated scales displayed thereon, one said scale denoting body weight and the other scale denoting blood alcohol level; a pair of movable pointers, each permitting readings from a different said scale; a first shaft connected to said pointer denoting blood alcohol and being connected to a ratchet wheel and to means for rotating said shaft at a constant rate; means operably connected to said blood alcohol scale preventing turning of said scale in a direction opposed to the direction of movement of said first shaft; a second tubular shaft disposed and rotatable about said first shaft, said second shaft being connected to said blood alcohol scale and to a stop plate, said stop plate having a protrusion adapted for contact with a pin connected to said ratchet wheel for turning said stop plate with said ratchet wheel; a pinion rotatably mounted about said second shaft and frictionally connected to said blood alcohol scale; a rack threadably engaged to said pinion and having means permitting manual depression thereof; a third shaft connected to to said pointer denoting body weight and having means limiting movement of said rack according to the position of said pointer relative to said body weight scale.

* * * * *